(Specimens.)
H. E. MILLER.
MANUFACTURE OF BACKS FOR BRUSHES FROM CELLULOID AND OTHER PLASTIC MATERIAL.
No. 345,983. Patented July 20, 1886.
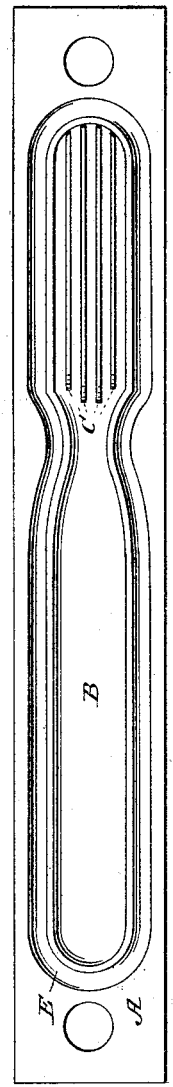
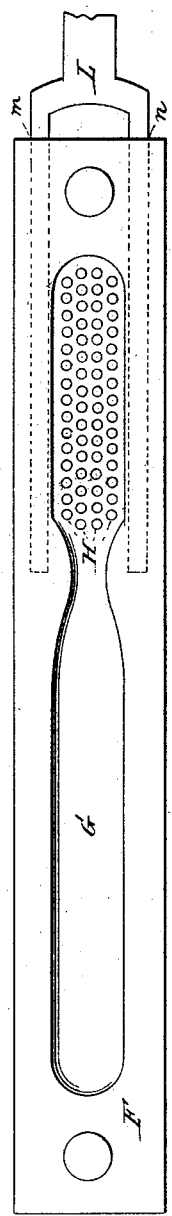
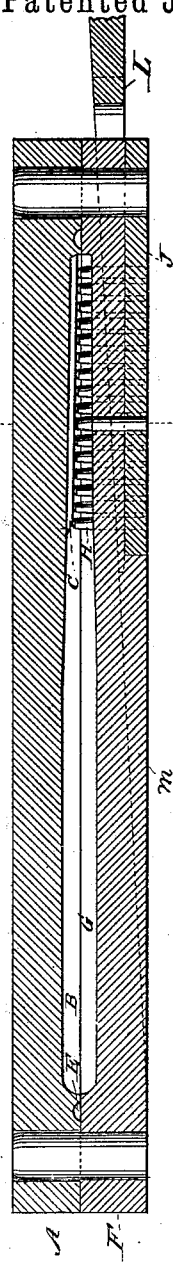
WITNESSES:
Edward Wolff.
A. L. Shaw
INVENTOR
Horace E. Miller,
BY Chas. E. Gill
ATTORNEY

UNITED STATES PATENT OFFICE.

HORACE E. MILLER, OF NEWARK, NEW JERSEY, ASSIGNOR OF ONE-HALF TO JOHN L. FERGUSON, OF LARCHMONT MANOR, NEW YORK.

MANUFACTURE OF BACKS FOR BRUSHES FROM CELLULOID AND OTHER PLASTIC MATERIAL.

SPECIFICATION forming part of Letters Patent No. 345,983, dated July 20, 1886.

Application filed January 29, 1886. Serial No. 190,147. (Specimens.)

*To all whom it may concern:*

Be it known that I, HORACE E. MILLER, a citizen of the United States, and a resident of Newark, in the county of Essex and State of New Jersey, have invented certain new and useful Improvements in the Manufacture from Celluloid and other Plastic Material of Backs for Brushes, of which the following is a specification.

The invention relates to improvements in the manufacture from celluloid and other plastic materials of backs for brushes, and particularly for tooth and nail brushes; and it consists, essentially, in a novel die or mold, in which the plastic material is subjected to heat and pressure, and given the desired form, and in the product of the mold as an article of manufacture.

The invention will be fully understood from the detailed description hereinafter presented, reference being had to the accompanying drawings, in which—

Figure 1 is a view of the inner face of the top or upper section of the mold. Fig. 2 is a view of the inner face of the bottom or lower section of the mold. Fig. 3 is a vertical longitudinal section of the two parts of the mold in position. Fig. 4 is a vertical transverse section on the dotted line *a b* of Fig. 3. Fig. 5 is a view of the upper face of the back of the brush as it appears after leaving the mold. Fig. 6 is a vertical transverse section on the line *c d* of Fig. 5; and Fig. 7 is a similar view on said line, but illustrating the application of strips of plastic material to fill the grooves formed in the upper face of the brush-back by the mold, and to cover the usual wires by which the bristles are secured.

In the drawings, A denotes the upper section of the mold, which is elongated in outline, and has formed in its inner face the matrix B, adapted for the formation of the upper half of a tooth-brush back. One end of the matrix B is of suitable configuration to produce a handle of desirable proportions, while the other end is in the contour of the stock end of the back, and has the longitudinal parallel ribs C, adapted to impress grooves D into the plastic material during the process of manufacture, as hereinafter described. In the inner face of the section A of the mold, and surrounding the matrix B, is cut an overflow-channel, E, to receive the surplus celluloid or other plastic material that may be employed in the manufacture of the backs. The lower section of the mold (designated by the letter F) has a matrix, G, corresponding in outline with the matrix B, and adapted for the formation of the lower half of the tooth-brush back, the stock end of the matrix G being supplied with a series of pins, H, arranged in lines to come immediately below, and at their upper ends to impinge the ribs C when the two sections of the mold are in face to face contact. The purpose of the pins H is to form suitable apertures or pockets, I, in the plastic material to receive the usual bristles, and the object of their alignment with the ribs C is to form an open passage from the pockets I into the grooves D, in order that the usual method of introducing the wires for the purpose of retaining the bristles may be followed. It will usually be found that a thin film of the material will remain between the pockets I and grooves D, no matter how precise the adjustment of the points of the pins H to the ribs C, but this film is so thin that it may be readily broken through to admit the wire utilized for securing the bristles.

The series of pins H are rigidly secured at their lower ends in a plate, J, adapted to fit a suitably-formed recess in the lower face of section F, as shown in Fig. 3, the pins thence extending upward through close-fitting apertures in said section into the matrix G, wherein they slightly taper upward to the ribs C, as indicated in Figs. 3 and 4.

In the operation of using the die for the purpose of forming tooth-brush backs it will be found desirable to keep it and the strips of plastic material heated. In forming the brush-back the plain strip of celluloid or other plastic material is placed in the matrix G, one of its ends resting on the pins H, and the section A of the mold arranged over it, bringing the matrices G and B in line with each other, after which the whole is subjected to pressure between heated surfaces, and the article thus given form. The brush-back may be removed from the mold by first elevating the upper section, A, and then withdrawing the pins H from the matrix G and pockets I, which withdrawal may be accomplished by driving the forked end of an instrument, L, into the inclined channels *m n*, between the bottom of section F and the plate J. It is essential that all of the pins H be moved simultaneously from the plastic material, and hence the lower edges of the instrument L are horizontal and move on the inner flat surface of the plate J, while its upper edges are inclined downward toward its front end and move against the inclined upper surfaces of the channels *m n*, aforesaid, formed in the section F of the mold, the result being that when the forked end of the instrument is driven into the said channels it will simultaneously press against the plate J along its full length and at each side and gradually and evenly force the pins H from the matrix G and from the brush-back therein. The bristles (not shown) will be secured in the pockets I by means of wire in the customary way, after which narrow strips of celluloid *t* will be introduced into the grooves D to fill the same and cover the wire, the strips being held therein and caused to weld to the back by celluloid cement or other solvent of celluloid applied either to the strips or grooves. The strips *t*, when secured in place, as described, constitute a permanent part of the brush-back, and as such effectually prevent the wire from becoming loose and impart a finished appearance to the article.

The brush-back produced as above described possesses all of the desirable characteristics of the most expensive bone and ivory backs, and may be produced and marketed at far less expense. The process hereinbefore set forth of manufacturing the back from plastic material insures the parallelism of the pockets I and their due relation to the grooves D by the process described. The grooves D and pockets I are made at a single operation, and the hand-labor heretofore necessary for forming these parts is dispensed with.

The handle portion of the brush-back may be made as slender as desired, and if at any point therein the thickness should be incompatible with the required strength, a rod of steel wire or other suitable appliance may be welded into the material during the formation of the back, and thus the necessary strength be secured.

In manufacturing what are known as "solid-back" or "end-drawn" brushes, the ribs C will be omitted from the mold, and after the plastic material has been removed from the matrices the usual longitudinal holes will be drilled in the back in line with the pockets I.

What I claim as my invention, and desire to secure by Letters Patent, is—

1. The brush-back, of celluloid or other plastic material, having the grooves D and pockets I, the former being permanently closed, after the bristles have been secured in place, by strips *t* of the material, substantially as set forth.

2. The brush-back made from celluloid or analogous compound of pyroxyline, and having the grooves D and pockets I, the latter being arranged in line with the former, and the whole being formed by heat and pressure, substantially as set forth.

3. The die or mold consisting of sections having matrices B G, the former having ribs C, and the latter a series of pins, H, arranged in lines beneath the ribs *c*, substantially as set forth.

4. The die or mold consisting of the sections having matrices B G, the former having ribs C, and the latter the series of pins H, secured to a removable plate, J, substantially as set forth.

5. The die or mold consisting of the sections having matrices B G, the former having ribs C and the latter pins H, secured to a removable plate, J, combined with the channels *m n*, and forked implement L, substantially as set forth.

6. A die or mold consisting of the sections having matrices B G, the former adapted to form the upper face of the brush-back, and the latter having a series of pins, H, arranged to form pockets in the back to receive the bristles, substantially as set forth.

Signed at New York, in the county of New York and State of New York, this 27th day of January, A. D. 1886.

HORACE E. MILLER.

Witnesses:
JOHN L. FERGUSON,
CHAS. C. GILL.